Dec. 7, 1926.
J. P. DOVEL
1,609,611
GAS CLEANER
Filed May 7, 1921    2 Sheets-Sheet 1
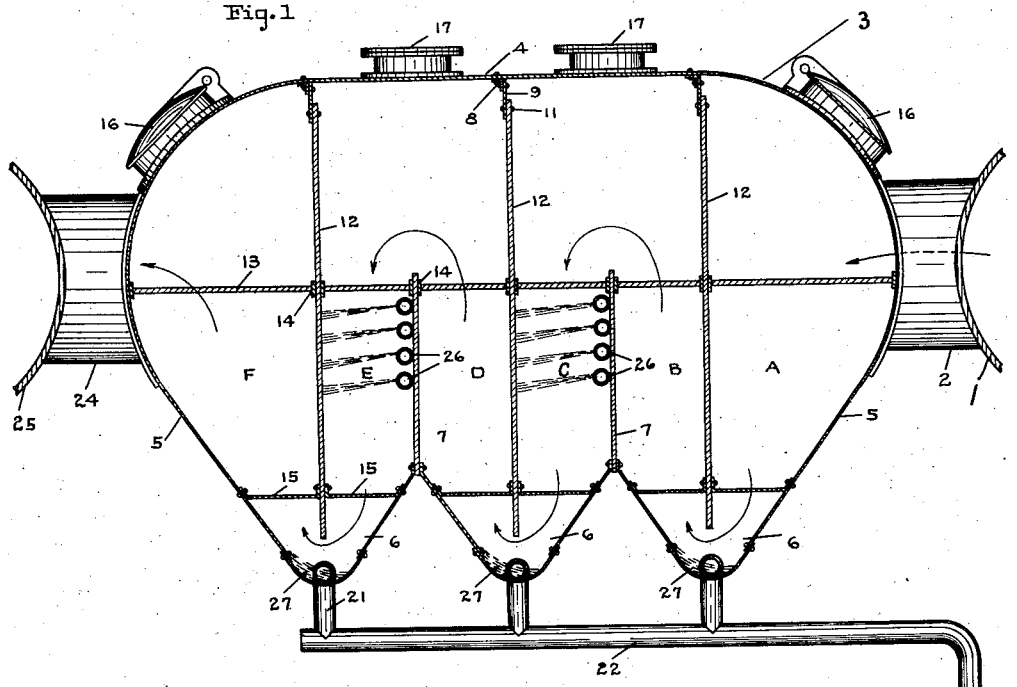
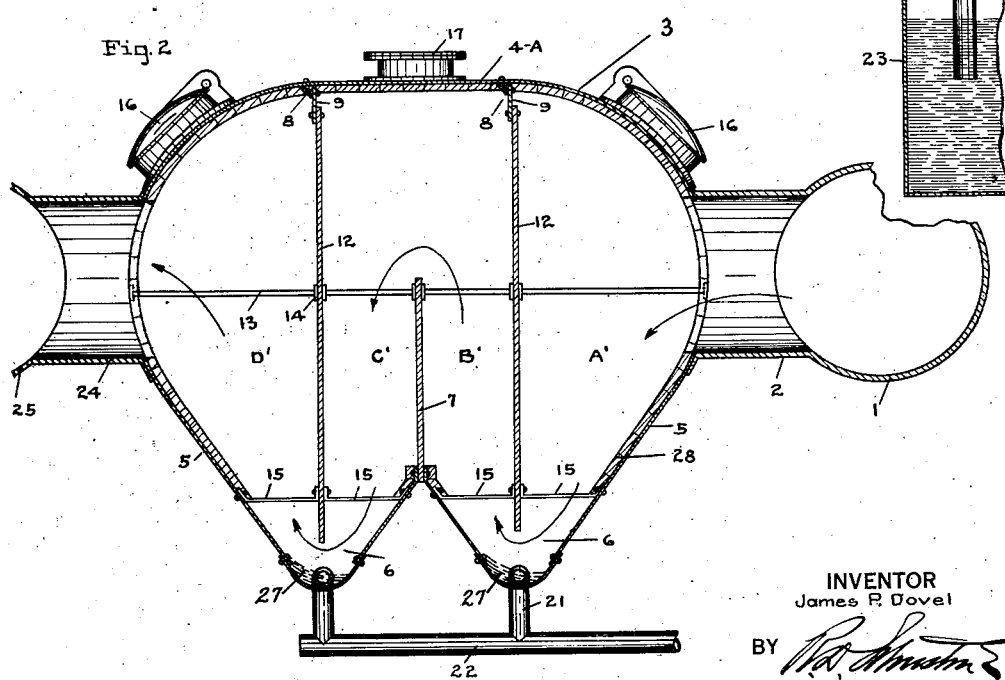
INVENTOR
James P. Dovel
BY 
ATTORNEY Dec. 7, 1926.

J. P. DOVEL 1,609,611

GAS CLEANER

Filed May 7, 1921    2 Sheets-Sheet 2

Inventor
J. P. DOVEL.
By
Attorney

Patented Dec. 7, 1926.

1,609,611

UNITED STATES PATENT OFFICE.

JAMES P. DOVEL, OF BIRMINGHAM, ALABAMA.

GAS CLEANER.

Application filed May 7, 1921. Serial No. 467,679.

My invention relates to an apparatus for removing from a gas stream particles of foreign matter in suspense therein.

My invention while generally available to clean any gas, is more particularly concerned in improving the blast furnace gas cleaner and purifier which forms the subject matter of Letters Patents Nos. 1,001,738, and 1,001,740, issued to me on the 29th day of August, 1911, in which is shown an elongated cleaning drum or shell, inclined for the longitudinal flow therethrough of a stream of water, with a longitudinal baffle extending in close proximity to the surface of the water stream so as to cause the gas to make a sharp reverse turn at high velocity in passing under the baffle, and in doing which practically all of the heavier foreign matter in suspense in the gas is thrown out centrifugally in its outer stratum where it comes into contact with the water and is caught. Such an apparatus has proven to be of exceptional commercial value, particularly as applied to the cleaning of gas from blast furnaces in which the character of the burden is such as to produce a comparatively uniform flow of gas.

In adapting my invention for use in furnaces where the tendency to slips in the furnace is frequent, the resultant outpour of dirty gas places an abnormal duty on the cleaners for which special provision should be made in their design.

One object of this invention therefore is to design this type of cleaner so as to enable it to obtain the same efficient cleaning of the gas while at the same time providing a much greater area of passage for the gas through the cleaner so that it can the better handle rushes of dirty gas due to slips in the furnace and other abnormal conditions therein. To this end the drum or cleaner casing is provided with a plurality of interleafed baffles extending longitudinally and connected alternately to top and bottom of the casing, each baffle suspended from the top being disposed above and spaced from its respective cleaning stream of liquid. The result is to produce a cleaner in which the gas is given two or more passes or whirls in its transverse flow across the cleaner.

One important advantage of the use of a multiplicity of baffles is that the first or initial baffle can be relied on not only partly to clean the gas but in doing so to distribute properly the gas stream so that it is presented in an ideal condition to the second or succeeding baffles for their cleaning action. If the clearance under the initial baffle is greater than the clearances necessary for the final cleaning of the gas, the distribution will be more easily effected and at the same time the gas stream will be relieved of its heaviest particles and will come in a partially cleaned state for treatment under the second or succeeding baffles. The baffle clearances can be regulated according to the specific requirements in each case.

I have found by experiment with a single pass cleaner where the clearance between the baffle and the collecting stream of water is reduced to the lowest minimum which will avoid causing the gas stream to pick up particles of water, that I am enabled to remove approximately 90° of the impurities. By increasing the number of passes, I am enabled to clean the gas as effectively and at the same time to operate with larger clearances and therefore with a greater margin of safety for excessive gas flows, the clearances being designed so that the highest probable gas velocities in making a pass would stay below that where the gas would pick up the water and thus I attain a highly effective cleaning while providing a much wider margin for the varying flow of gas and a better distribution thereof.

Another advantage of my present invention which applies equally to constant as well as variable gas flows, is that I can with, no appreciable increase in cost, clean the gas to a very high degree and cool it thereby making it available for gas engine use, the latter pass or passes of the gas being utilized to throw out therefrom any particles of moisture either picked up from the dust collecting stream or from washing jets discharged into the gas at one or more of the initial passes for the purpose of more effectively cleaning it and reducing its temperature.

A further advantage of my invention lies in the design of the cleaner casing so that it can be inspected and cleaned out without requiring the men to enter it. By this means I avoid the necessity of providing expensive valves in the gas mains which are required by the safety laws of various States. By arranging these manholes or clean out openings in close proximity so as to give access to each baffle compartment, a crew of men working on top of the cleaner casing can very effectively clean it out with but a few minutes interruption of the gas flow therethrough.

My invention will be better understood and its scope more clearly defined by reference to the following specification and claims, read in conjunction with typical embodiments of my invention illustrated in the accompanying drawings, in which:—

Fig. 1 shows a three-pass cleaner in vertical transverse cross section with the cooling sprays used.

Fig. 2 is a similar view illustrating a two-pass cleaner brick lined for the cleaning of the gas without appreciable loss of its sensible heat.

Similar reference numerals refer to similar parts throughout the drawings.

Figure 3:
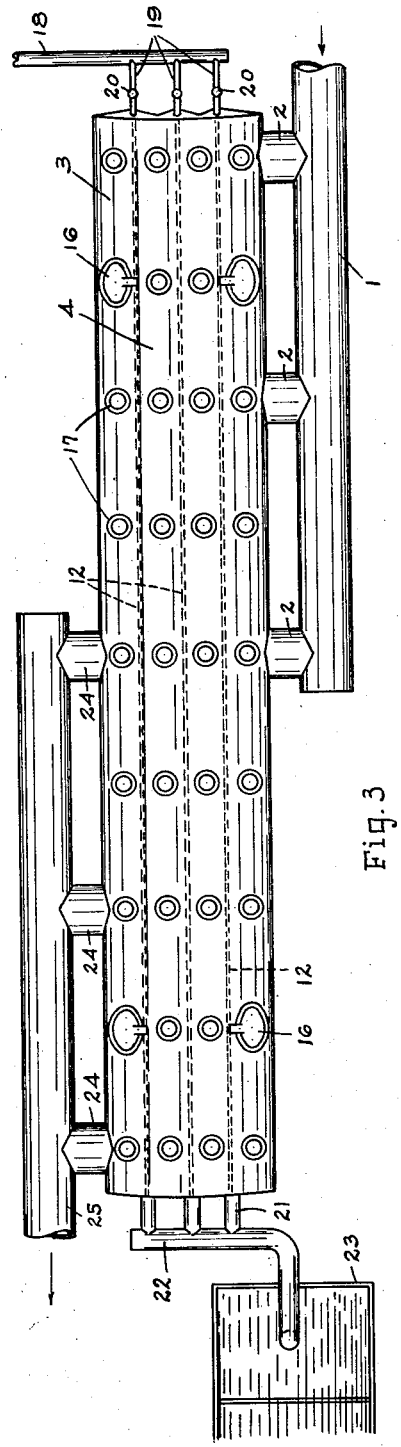
Figs. 3 and 4 illustrate typical plan and side elevation views of the three-pass cleaner shown in Fig. 1 with the water spray pipes omitted.
Figure 4:
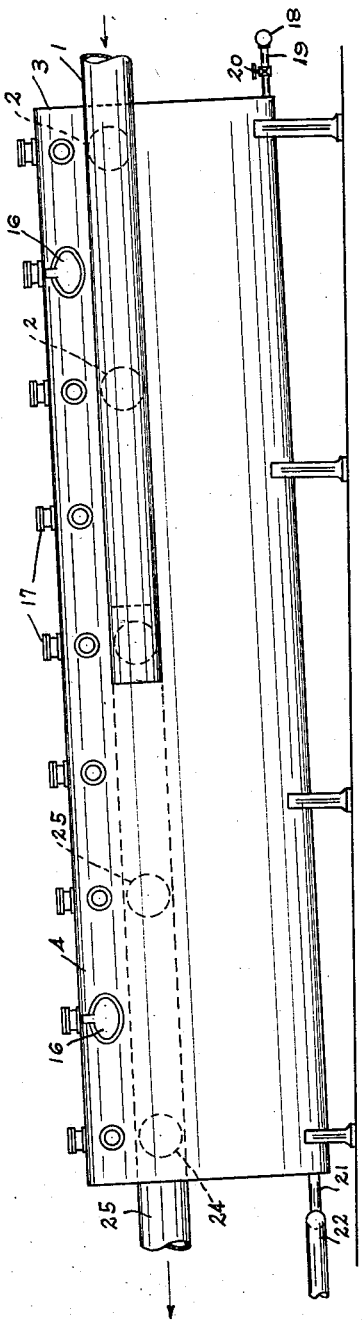

Referring to the three-pass cleaner illustrated in Figs. 1, 3 and 4, I show the dirty gas, to be cleaned, conducted to the cleaner through a manifold pipe 1 having branch pipes 2 adapted to enter the casing 3 of the cleaner at the center, at points midway between said center and both ends, and at one end thereof so as to effect a partial distribution of the gases delivered thereinto. The cleaner shell or casing is an elongated casing, formed of suitably shaped metal sheets, which is provided with a substantially flat top 4, curved downwardly and inwardly sloping sides 5, and a series of parallel bottom troughs 6 extending the full length of the cleaner and separated by baffles 7 mounted at the apex of the adjacent reversely inclined trough walls. These bottom baffles 7, of which two are provided, are formed of cast metal plates which extend from end to end of the casing and rise to a level substantially in line with the center of the inlet pipes 2. To the inner face of the top 4, along the center and at each side, I attach angle irons 8 to the downturned flanges of which I bolt plates 9 having apertures therethrough for the reception of the bolts 11 which suspend a top baffle 12 from each angle iron. These baffles 12 are preferably made of cast iron plates and extend from end to end of the casing, projecting downwardly in line with the longitudinal center of each trough 6 to a level approximately nine inches from the bottom of the trough. One of these baffles overlies and projects into each of the troughs and I provide cross bracing bolts 13 which pass transversely through the centers of the top baffles 12 and the top of the bottom baffles 7 and are made fast at their ends in the side walls 5 of the casing, the bolt or head being threaded to receive nuts or collars 14 which space and secure each baffle in relative position on the bolt. The baffles 12 along their lower edge are further braced by the bars 15 which are bolted thereto and to the sides of the adjacent trough. In each side wall 5 of the casing I provide a series of explosion doors 16 disposed at suitable intervals, and along the top of the casing between the baffles 12 I provide a series of manhole openings 17 to permit inspection of or access to the interior of the cleaner for repairing or cleaning it out when necessary. The explosion doors are provided in case there is a slip in the furnace, when the resultant rush of gases, if too great to pass under the baffles, will open and escape through these explosion openings, thus avoiding permanent damage to the apparatus.

The cleaner casing, as a whole, is set at a suitable incline so that water admitted to the upper end of each trough from the manifold water supply pipe 18 through branch pipes 19 under control of valves 20, will flow in a continuous stream along each trough to its respective outlet pipe 21, each of which is connected to a discharge manifold pipe 22 which conducts the water and sludge into a basin or settling chamber 23 into which the discharge end of the pipe enters and is submerged sufficiently to form a gas seal. The gases are conducted from the cleaner by branch pipes 24 to a discharge manifold pipe 25 whence it flows to the desired point of use.

If desired I may utilize water spray pipes 26 disposed on the far side of the first bottom baffle 7, and if desired also on the far side of the second baffle 7 so that the gas is caused to flow through and be cooled by these sprays after making its first pass and before making its last pass, thus effectively bringing down the temperature of the gas, where this is desired, as in case it is to be used in a gas engine.

The operation of this embodiment of my invention is as follows: The gas to be cleaned is conducted from the furnace or other source of supply to the manifold pipe 1 and, through branch pipes 2 enters, is distributed lengthwise of the cleaner in the initial compartment A. As its only outlet from this compartment is through the small clearance under the initial baffle 12 the gas becomes distributed lengthwise of the casing as it flows down through the gradually restricted passage to the first trough 6 and makes its pass under the first baffle 12 in rounding which the gas makes a short sharp turn through a clearance usually from six to eight inches left between the baffle and the top surface of the flowing stream of water indicated at 27 in Fig. 1, and in making this sharp turn at high velocity the foreign matter suspended in the gas is centrifugally projected from the gas or collected in its outer film which is flowing in surface contact with the collecting stream of water 27, which thus catches and holds the foreign matter without causing any appreciable amount of the water to be taken up by the gases. After making the first pass, the gas flows upwardly through the compartment B and over the first baffle 7, entering the first spray compartment C. In flowing downwardly through this compartment the gas, which by this time is uniformly distributed along the casing, passes through the sprays which moisten any foreign matter remaining in the gases and cools the latter, the spray water and foreign matter being ejected from the gases in their pass under the second baffle 12 before entering the compartment D. The gases flow over the second baffle 7 and down through the second cooling sprays 26, if such be desired, in the compartment E and make a final pass under the last baffle 12 and enter the discharge compartment F from which they flow through the branch pipes 24 to the manifold 25. With this arrangement, the major portion of the foreign matter is collected in the initial pass and the distributed and practically cleaned gases in making the second and third passes will be further relieved of any remaining foreign matter, and, where sprays are used, of the particles of moisture taken up from the sprays, as in practice all heavier particles of foreign matter, ore, coke or water are centrifugally ejected from the gas stream as it makes its last pass under the baffle 12.

By arranging the clearance between the baffles 12 and the water streams so that a lesser percentage of foreign matter is taken out at each pass but in the aggregate a greater amount of foreign matter is removed than with a single close pass, I provide the cleaner with an overload capacity which will enable it to handle a greatly increased volume of gases with high cleaning efficiency, the only effect of any excess flow of gas being to increase the relative percentage of foreign matter removed in the initial pass as compared with the succeeding passes, because obviously, when the velocity and volume of the gas stream flowing under the first baffle increases towards the critical volume the cleaner can pass, the percentage of foreign matter removed in the initial pass increases up to the maximum which can be removed at a single pass.

It is within the contemplation of my invention that the clearances between the water streams and the baffles 12 can be varied relatively or made all alike to produce the desired cleaning action indicated in the operating conditions for each cleaner. The inclination of the cleaner and the volume of water flowing in the collecting streams in the troughs 6 are such as to cause these streams to carry out with them the dust and foreign matter collected and deliver the same through pipes 21 and manifold 22 to a trap or seal, which, as shown, is the chamber 23 that forms the supply end for a decanting or purifying apparatus that forms the subject matter of a companion application. It will be observed that the cleaner casing 3 in the form illustrated in Fig. 1, is especially designed to clean and reduce the temperature of gases for use in a gas engine.

Referring now to the type of cleaner illustrated in Fig. 2, the top 4ª of the cleaner has attached thereto only two angle irons 8 which, by means of the plates 9, support two baffles 12, each of which is suspended over its respective trough 6 of which there are only two provided. Here only a single bottom baffle 7 is utilized, the baffles being cross connected and braced by the bolt 13 and nuts 14 in the manner already described. In this design the walls 4 and 5 down to the troughs 6, are lined with brick 28 and the top is provided with the explosion doors 16 on each side and with manholes 17 giving access on each side of and between the baffles 12. The gases enter through the manifold 1 and branch pipes 2 and are discharged through branch pipes 24 and manifold 25. In this arrangement the gases enter the chamber A', make a pass under the first baffle 12 and are distributed thereby, and then pass successively through the chambers B' and C', and make a second and final pass under the last baffle 12, after which they enter the discharge compartment D' of the cleaner. In this arrangement no sprays are used and the clearances under the baffles 12 are calculated in the aggregate to produce the desired cleaning of the gas stream while providing the requisite overload capacity for the purposes already described. As shown here the initial baffle 12 is set to provide a larger clearance than exists under the final baffle 12.

The doors 16 and 17 are arranged at close intervals along the casing so that men standing on the casing can quickly clean it out without having to enter the casing. This is important as where the men have to enter the cleaner, the gas mains must be provided with very expensive gas sealing valves, which are not needed with my cleaner.

This invention is not intended to be restricted in scope to the specific embodiments shown, but contemplates such modifications as come within the spirit and scope of the claims.

Having thus described my invention, what I claim as new and desire to secure by Letters Patent, is:—

1. In a gas cleaning apparatus, an elongated tubular inclined casing having a series of inclined bottom water ways, means to cause a stream of water to flow along each water way, a vertical baffle rising between said water ways, and a longitudinal baffle depending from the top wall of the casing above each stream to cause the body of gas to whirl thereunder and sweep across the surface of the underlying stream of water transversely to its line of flow, the initial baffle being spaced to provide a greater clearance between it and its respective water stream than is provided under the surrounding baffles.

2. In a gas cleaner, a series of communicating cleaning chambers having means to admit gas at one end of the series and to conduct off the cleaned gas from the other end of the series, a body of dust collecting fluid in each chamber, and baffle means disposed with successively decreasing clearances above said bodies of fluid to distribute the gas and give it a whirl in each chamber.

3. In a gas cleaning apparatus, a casing having opposite gas inlet and outlet pipes, and a plurality of partitions so disposed that the gas in passing through the casing flows in a gradually thinning sheet around said partitions, inclined walls against which the gas sheet impinges after rounding said partitions, and means to provide a constantly changing body of washing fluid along the lower portion of each of said inclined walls and below said partitions.

4. A gas cleaning apparatus comprising an elongated inclined tubular container having its bottom formed into a plurality of troughs, a baffle depending from the top above each trough and alternating with a baffle rising from the bottom between each pair of troughs, each baffle depending from the top and having its bottom edge substantially parallel with the bottom of the underlying trough and juxtaposed thereto, means to flow water along each trough, and transverse braces in the casing connecting the interposed baffles, there being inlet and outlet ports on opposite sides of the set of baffles, substantially as described.

In testimony whereof I affix my signature.

JAMES P. DOVEL